United States Patent Office 2,767,428
Patented Oct. 23, 1956

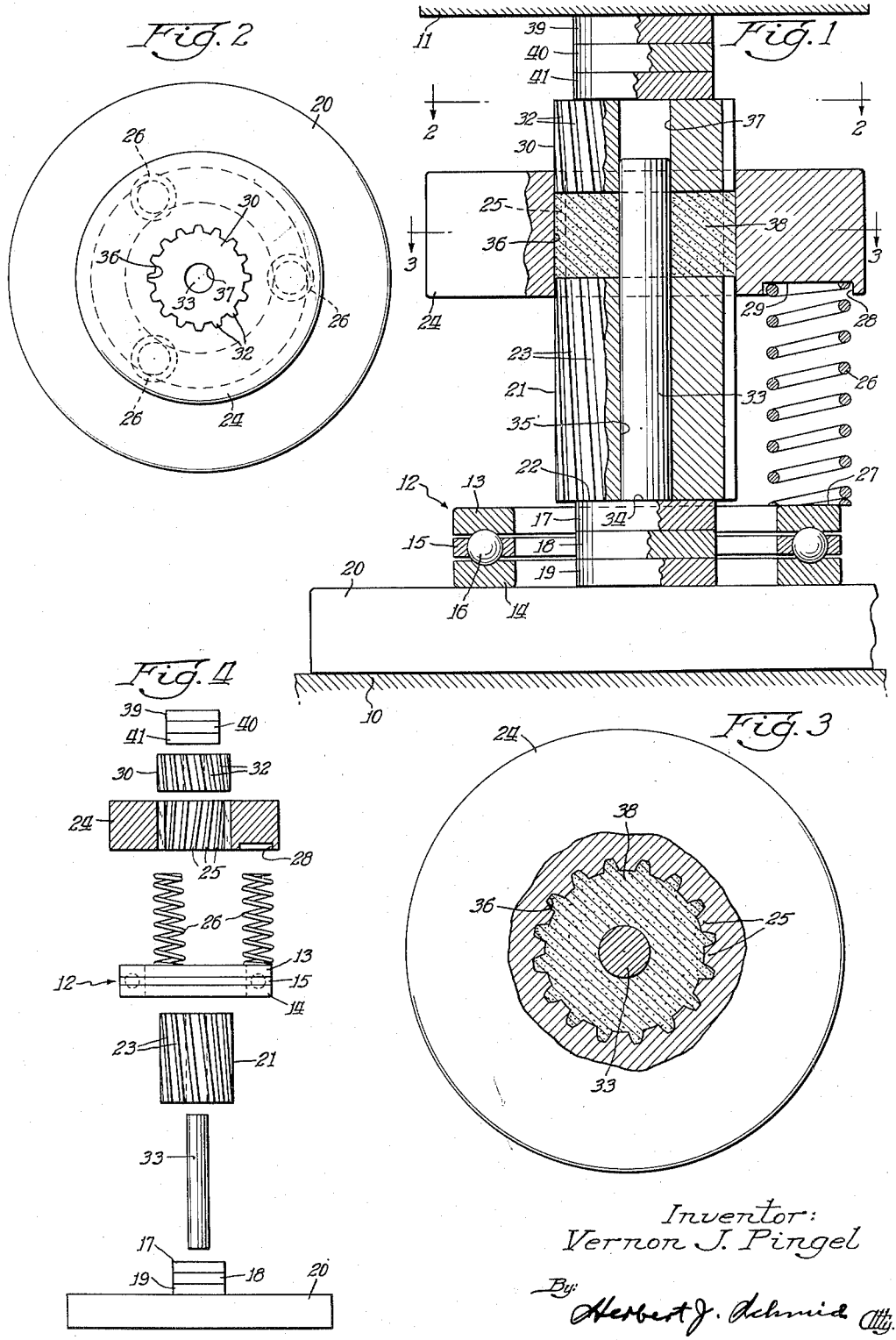

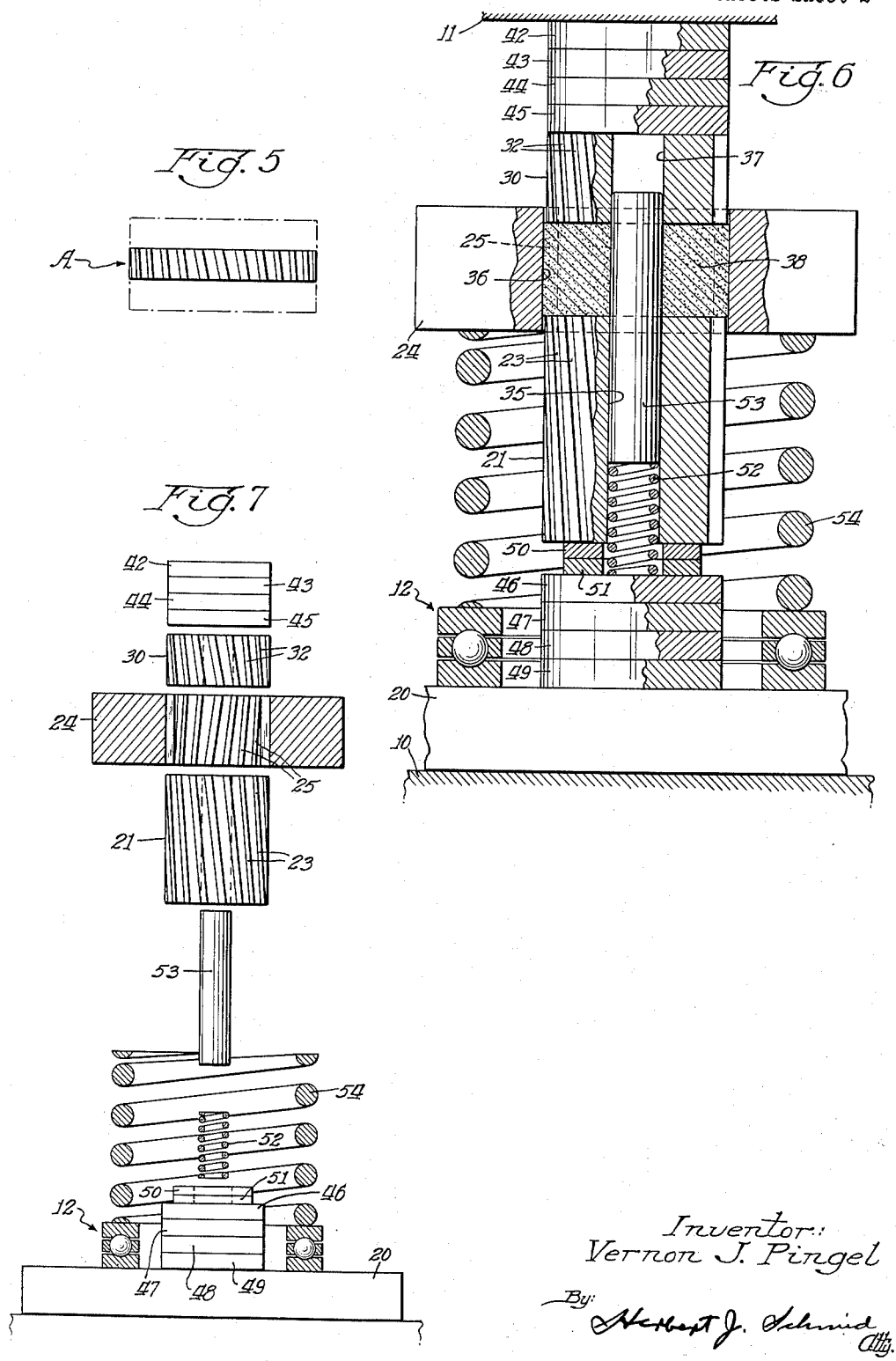

2,767,428

APPARATUS FOR MAKING TORQUE-TRANSMITTING ELEMENTS

Vernon J. Pingel, Arlington Heights, Ill., assignor to Borg-Warner Corporation, Chicago, Ill., a corporation of Illinois Application April 12, 1952, Serial No. 282,076

16 Claims. (Cl. 18—5)

This invention relates to methods and apparatus for making rotatable torque-transmitting elements having teeth or splines disposed at angles to the axis of rotation of the elements.

An object of the invention is to provide methods and apparatus for making torque-transmitting elements of powdered materials, such as metallic or non-metallic powders, and having teeth or splines disposed at angles to the axis of rotation of the elements.

Another object of the invention is to provide methods and apparatus for making torque-transmitting elements, such as gears or shafts, of powdered metallic or non-metallic materials and having external helical teeth or splines.

The invention further consists of the novel constructions, arrangements, devices, processes and methods to be hereinafter described and claimed for carrying out the above stated objects and such other objects as will appear from the following description of certain preferred embodiments of apparatus and methods for making torque-transmitting elements, when taken with reference to the accompanying drawings, wherein:

Figure 1 is a side elevation, partly in section, of apparatus for practicing the method of making a gear of powdered material and having external helical teeth;

Fig. 2 is a sectional view of the apparatus shown in Fig. 1, said section being taken on line 2—2 of Fig. 1 and looking in the direction of the arrows;

Fig. 3 is a sectional view of the apparatus shown in Fig. 1, said section being taken on line 3—3 of Fig. 1, and looking in the direction of the arrows;

Fig. 4 is an exploded view of the apparatus shown in Fig. 1;

Fig. 5 is an edge view of a gear formed by the apparatus shown in Figs. 1-4, inclusive;

Fig. 6 is a side elevational view, partly in section, of a modification of the apparatus shown in Figs. 1-4, inclusive; and Fig. 7 is an exploded view of the apparatus shown in Fig. 6.

Referring to the drawings, Figs. 1 to 4 illustrate a preferred form of apparatus for practicing the method of making torque-transmitting elements of powdered materials and having teeth or splines disposed at angles to the axis of rotation of the torque-transmitting elements. As an example of such torque-transmitting elements, the element may be a gear shown in Fig. 5 and formed of a powdered material which may be a metallic powder, or a non-metallic powder such as plastic composed of any one or more of a large group of organic materials, synthetic or not, that may be molded, for example, the plastic commonly known by the trade name "nylon."

The apparatus is particularly suited for practicing my method of forming torque-transmitting elements, such as gears, composed of compacted powdered metallic or non-metallic materials and having external helical teeth, such as the gear in Fig. 5, wherein each tooth of the gear is a spiral at any point transverse of the tooth. The apparatus shown in Figs. 1-4, inclusive, may be positioned between a stationary bed plate 10 and a vertically reciprocal, non-rotatable loading platen 11 of a hydraulic press capable of exerting large pressures, for example, thirty to forty tons per square inch.

The apparatus more particularly comprises a thrust bearing assembly 12 of conventional form and comprising top and bottom rings 13 and 14 and an intermediate ring 15, the intermediate ring 15 having a plurality of apertures therethrough receiving ball bearings 16 extending within opposed raceways in the rings 13 and 14. The thrust bearing assembly 12 surrounds a plurality of flat thrust members or discs 17, 18 and 19 in superposed relationship with the bottom disc 19 seated upon a flat plate 20 engaging the bed plate 10. A cylindrical punch 21 has its lower end seated as at 22 on the washer 17. The punch 21 is provided with a plurality of external helical teeth or splines 23 and the upper end of the punch extends within the opening 36 in an annular die 24. The opening in the die 24 is defined by helical splines 25 meshing at their lower ends with the upper ends of the helical splines 23 of the punch 21.

The die 24 is supported on three springs 26, the bottom ends of the springs being seated as at 27 on the top ring 13 of the thrust bearing assembly 12 and the upper ends of the springs being received within annular openings or recesses 28 in the die 24 and being seated as at 29 against the bottom walls of the recesses 28 in the die 24, the springs 26 thus yieldably supporting the die 24 on the bearing assembly 12. An upper punch 30 is received within the opening in the annular die 24 and is provided with external helical teeth or splines 32 having the lower ends thereof meshing with the upper ends of the helical teeth or splines 25 on the die 24. A core rod 33 has its lower end seated as at 34 upon the thrust disc 17 and extends through the central opening 35 of the punch 21, opening 36 in die 24, and into the opening 37 in the top punch 30. The opening in the die 36 defines a matrix within which is disposed a mass of powdered material 38, the upper end of the punch 21 being the bottom of the matrix and the core rod 33 extending upwardly through the mass 38. The powdered material 38 may be of any suitable metallic or non-metallic powder such as that previously described. For example, electrolytic iron powder of about 99% purity and —100 mesh and lubricated with 1% zinc stearate, or Swedish sponge iron powder, as well as other iron or iron alloy powders, have been successfully used in forming gears by my method and apparatus. Between the loading platen 11 and the upper punch 30 are provided a plurality of superposed thrust members or discs 39, 40 and 41, the platen 11 engaging the thrust member 39 and the thrust member 41 being seated upon the upper end of the top punch 30 as shown.

The assembly shown in Fig. 1 may be disposed between the stationary bed plate 10 and the loading platen 11 of a hydraulic press and pressure, for example, between thirty and forty tons per square inch, is then applied to the assembly by the loading platen 11. During the application of such pressure by the loading platen 11, the upper punch 30 will move downwardly and will also rotate, the helical meshing teeth of the punch 30 and the die 24 requiring the punch 30 to move in a helical direction, the punch 30 compressing the powder 38 within the opening 36 in the die 24 and between the punches 30 and 21 and also between the teeth 25 of the die 24 and also between the teeth 25 and the core rod 33. The punch 30 will move relative to the die 24 until the powder 38 has been compacted tightly against the teeth 25 of the die 24 and core rod 33, when the punch 30 and die 24 will rotate as a unit inasmuch as they will be locked up by the compacted powder, and the die 24 will then be forced downwardly and travel in a helical path due to the meshing teeth 25 of the die 24 and teeth 23 of the lower punch 21, the bottom punch 21 rotating during rotation of the die 24 and punch 30 as a unit. During this downward and rotary movement of the die 24, the springs 26 will be compressed between the die 24 and the bearing assembly 13 and will be caused to rotate by the die and with the die about the axis of rotation of the assembly, this movement being permitted by the ball bearing assembly 12.

An important feature of the invention is that the engaged surfaces of the thrust discs 39, 40 and 41, the engaged surfaces of the discs 17, 18 and 19, the engaged surfaces of the platen 11 and the thrust member 39, the thrust disc 41 and upper punch 30, the lower punch 21 and the disc 17, the thrust member 19 and the plate 20, the ground and polished flat surfaces and are preferably, but not necessarily, thoroughly lubricated with a lubricating agent such as oil or graphite. It will be noted that the thrust members or discs are used to carry the high compression loads and still allow the punches and die to rotate relative to each other in a helical direction.

Further, the engaging bearing surfaces of the thrust members and those surfaces thereof respectively engaging the punches 21 and 30 allows each one of these elements of the apparatus to rotate relative to the other elements during the aforesaid operation of the apparatus. While it is difficult to state exactly which of these elements of the apparatus rotate or relatively rotate at specific instances because of the variations in frictional conditions that are encountered from each element to another element, it has been clearly proven by experiment that should one element bind with relation to one or more other elements, due to frictional conditions, the engaged bearing surfaces of other elements and having the lowest or lesser friction will permit relative rotation of these other elements, when such movement becomes necessary. It may be noted that no synchronizing action of any of the elements or parts of the apparatus is controlled by mechanism external of the apparatus but that the apparatus has structural characteristics inherently providing a synchronizing action of the parts which occurs as the die will follow the punches, or vice versa, for, if one pair of engaged bearing surfaces of the thrust members, or of the thrust members and punches, should bind due to friction, another pair of engaged surfaces will permit relative rotation of their elements.

Another feature of the apparatus is that a partial simulated double action effect takes place upon the aforesaid functioning of the apparatus as, when the powder 38 has been compressed and compacted between the punches 30 and 21 and the core rod 33 and the die 24, the powder will be forced between the splines 25 of the die 24 so that the punch 30 and the die 24 will be locked up and rotate as a unit and then die 24 will be forced down on the lower punch 21 to cause rotation of the punch 21 and relative movement of the die 24 and the punch 21 by the intermeshing helical teeth thereof. The ball thrust bearing assembly 12 will function to take the light loads of the spring-suspended die 24 while allowing the die to rotate as a double action pressing effect, made possible by the springs, takes place.

Upon retraction of the platen 11, the compacted gear A is removed from the apparatus by forcing the die down over the bottom punch with a forked yoke engaging the top of the die so that the die will rotate in a helical direction on the lower punch due to the meshing teeth of the die and lower punch until the tops of the die and lower punch are on the same level, the gear rotating with the core rod. At this time, the gear and core rod are removable as a unit and the core rod may be moved axially relative to the gear, by any suitable mechanism, for freeing the gear from the core rod.

In view of the considerable pressure applied to the powdered material 38, the powder will be compacted to substantially one-third of its original height shown in dotted lines in Fig. 5, to provide the gear A having external helical teeth each having a left helix, due to the fact that the helices of the teeth or splines 25 of the die 24 are also left helices. It is believed apparent that, if the teeth or splines 23 of the punch 21, 25 of the die 24, and 32 of the upper punch 30, are right helices, a gear will be formed with right helix teeth.

Figs. 6 and 7 illustrate a modification of the apparatus shown in Figs. 1 to 4, inclusive, similar reference numerals being used to identify like parts of the apparatus shown in Figs. 1–4 and the apparatus shown in Figs. 6 and 7. The apparatus comprises the thrust ball bearing assembly 12, die 24 having internal helical teeth or splines 25 meshing with helical splines 32 of upper punch 30 and also meshing with helical splines 23 of the lower punch 21, the opening in the die 24 defining a matrix having its bottom provided by the upper end of the punch 21, the matrix containing the iron powder 38.

Positioned between the loading platen 11 and the upper punch 30 are a plurality of thrust members or discs 42, 43, 44 and 45. A plurality of thrust members or discs 46, 47, 48 and 49, in superposed relation, are positioned on the base plate 20 seated on the bed plate 10 of the hydraulic press. Between the lower punch 21 and the thrust disc 46 are a plurality of annular thrust washers 50 and 51, the thrust washers having engagement with each other and with the upper thrust washer 50 engaging the lower end of the punch 21, and the lower thrust washer 51 engaging the thrust disc 46. Positioned within the openings in the thrust washers 50 and 51 and within the centrally located opening 35 of the lower punch 21 is a spring 52 supporting a core rod 53, the lower end of the spring being seated on the thrust disc 46 and the upper end of the spring engaging the core rod 53. The core rod 53 is positioned with the opening 35 in the punch 21, and extends through the opening 36 in the die 24 and into the opening 37 in the upper punch 30. A helical spring 54 surrounds the punch 21 and has its upper end seated against the die 24 and its bottom end seated upon the ball bearing assembly 12, the spring 53 thus supporting the die 24 on the bearing assembly.

All of the engaged bearing surfaces of the thrust discs and washers 46 to 51, inclusive, the engaged bearing surfaces of the thrust discs 42—45, inclusive, as well as the respective engaged bearing surfaces of the thrust members and the surfaces thereof engaged with the surfaces of the platen 11, punches 30 and 21, and plate 20, are ground and polished flat surfaces which may be provided with lubricants, such as oil or graphite.

Upon downward movement of the plate 11 of the hydraulic press to exert a pressure between thirty and forty tons per square inch on the apparatus, a simulated double action will be had on the die 24 and the core rod 53 caused by the friction of the compressed powder 38 when the powder is compressed tightly against the core rod and die. More particularly, as the punch 30 moves downwardly, it will compress the powder 38, and the punch 30 will move downwardly and rotate as it will follow a helical path provided by the intermeshing of the helical teeth 32 of the punch 30 and the helical teeth 25 of the die 24. When the powder compresses tightly against the teeth 25 of the die 24 and the core rod 53, the compressed powder will cause the die 24, core rod 53 and the punch 30 to rotate as a unit, with the die 24 and core rod 53 and punch 30 moving downwardly in a helical direction due to the meshing teeth of the die 24 and punch 21.

Due to the action of the spring 52, the core rod 53 will resist the frictional effect of the compacted powder on the core rod and will be supported in its uppermost position until such time when the powder has compacted against the core rod to an extent setting up sufficient friction to cause the core rod 53 to move downwardly and compress the spring 52. When the die 24 is moved downwardly, the spring 54 will resist such downward movement of the die 24, while the bearing assembly 12 will permit rotation of the die 24 and spring 54. However, as the powder 38 is more firmly compacted, the friction exerted by the powder on the splines 25 of the die 24 will cause the spring 54 to be compressed permitting downward movement of the die 24. Due to the fact that all of the engaging surfaces of the thrust discs and washers are lubricated, the thrust washers or discs will carry the high compression load and still allow the punch 30 and die 24 to move downwardly and to rotate in a helical direction. The ball thrust bearing assembly 12 is used to take the light loads of the spring-suspended die 24 and allows the die to turn as the double-action pressing effect (made possible by the spring 54) takes place. The thrust washers and discs, as well as the punches, are allowed to move relative to one another so that should the friction become sufficiently great to cause conjoint rotative movement of any two of these elements of the apparatus, there will be insufficient friction between two other elements to prevent relative rotative movement thereof when such movement becomes necessary. Due to the variations in the friction conditions encountered from one element to another element of the apparatus, it is difficult to state exactly which elements rotate at specific instances during downward movement of the platen 11. The apparatus illustrated in Figs. 6 and 7 will produce a gear such as shown in Fig. 5, the powder being compacted to substantially one-third its height in order to provide the gear A.

It may be noted that there is no external mechanism controlling any synchronizing action of the die and punches, but a synchronizing action is inherent in the structural characteristics of the die and punches inasmuch as, in the movements of the die and punches, the die will follow either of the punches, or vice versa, i. e. if the die binds due to friction, then either of the punches will rotate, or vice versa.

In the two described and illustrated apparatus, the punches 30 and 21, as well as the die 24, are shown as having meshing helical teeth of left helix. However, it will be clearly apparent that right helix teeth may be used to produce a gear having teeth of right helix.

It is to be understood that while I have shown methods and apparatus for forming a torque-transmitting element having helical teeth, it will be apparent that torque-transmitting elements, such as spur gears, having straight teeth and which are at angles to the axis of the element may be made by providing the dies and punches with such teeth. Furthermore, the diameter and thickness of the torque-transmitting elements may be varied by utilizing dies and punches suitable for the desired thickness and diameter of the element. It is also believed to be readily apparent that, if a hydraulic press having reciprocal upper and lower platens movable toward each other, and providing a double action effect on the apparatus, is used it is not necessary that the springs 26 in the apparatus shown in Fig. 1 or spring 54 and spring 52 in the apparatus shown in Fig. 6 be utilized as will be apparent to those skilled in the art.

I claim:

1. Apparatus for making a torque-transmitting element of compressed powdered material and having external teeth each disposed at an angle to the axis of rotation of the element comprising spaced members and a die member having a circular opening receiving said spaced members and defining therewith a cavity for the reception of powdered material, said die member having internal teeth defining the circular opening therein and meshing with external teeth on said spaced members and also extending into said cavity, the teeth of said members being disposed at angles to the axis of said opening in said die member; means for moving said spaced members toward each other to compress the powdered material in said cavity to form the torque-transmitting element; and means disposed between and engaged by said moving means and said spaced members to allow relative rotation between the spaced members and the die member, such rotation being controlled solely by the intermeshing teeth of said members during operation of said moving means.

2. Apparatus for making a gear of compressed powdered material and having external teeth each disposed at an angle to the axis of rotation of the gear comprising spaced members and a die member having a circular opening receiving said spaced members and defining therewith a cavity for the reception of powdered material, said die member having internal teeth defining the opening therein and meshing with external teeth on said spaced members and also extending into said cavity, the teeth of said members being disposed at angles to the axis of said opening of said die member; means for moving said spaced members toward each other to compress the powdered material in said cavity to form the gear; and means disposed between and engaged by said moving means and said spaced members to allow relative rotation between the spaced members and the die member, such rotation being controlled solely by the intermeshing teeth of said members during operation of said moving means.

3. Apparatus for making a torque-transmitting element of compressed powdered material and having external helical teeth comprising spaced members and a die member surrounding said spaced members and defining therewith a cavity for the reception of powdered material, said die member having internal helical teeth meshing with external helical teeth on said spaced members and also extending into said cavity; means for moving said spaced members toward each other to compress the powdered material in said cavity to form the torque-transmitting element; and means disposed between and engaged by said moving means and said spaced members to allow relative rotation of the spaced members and the die member during operation of said moving means, the intermeshing teeth of said members being the sole means to produce said rotation.

4. Apparatus for making a gear of compressed powdered material and having external helical teeth comprising spaced members and a die member surrounding said spaced members and defining therewith a cavity for the reception of powdered material, said die member having internal helical teeth meshing with external teeth on said spaced members and also extending into said cavity; means for moving said spaced members toward each other to compress the powdered material in said cavity to form the gear; and means disposed between and engaged by said moving means and said spaced members to allow relative rotation of the spaced members and the die member during operation of said moving means, the intermeshing teeth of said members being the sole means to produce said rotation.

5. Apparatus for making a torque-transmitting element of compressed powdered material and having external teeth each disposed at an angle to the axis of rotation of the element comprising spaced members and a die member having a circular opening receiving said spaced members and defining therewith a cavity for the reception of powdered material, said die member having internal teeth defining the opening therein and meshing with external teeth on said spaced members and also extending into said cavity, the teeth of said members being disposed at angles to the axis of said opening in said die member; means for moving said spaced members toward each other to compress the powdered material in said cavity to form the torque-transmitting element; a plurality of thrust elements disposed between said moving means and said spaced members and having engaged bearing surfaces to allow rotation of said members relative to said moving means during operation of said moving means, means for mounting said die member to permit it to rotate under control of the intermeshing teeth of the die member and the spaced members.

6. Apparatus for making a gear of compressed powdered material and having external helical teeth comprising spaced members and a die member surrounding said spaced members and defining therewith a cavity for the reception of powdered material, said die member having internal helical teeth meshing with external helical teeth on said spaced members and also extending into said cavity; means for moving said spaced members toward each other to compress the powdered material in said cavity to form the gear; and a plurality of thrust elements disposed between and engaged by said moving means and said spaced members and having engaged bearing surfaces to allow rotation of said members relative to said moving means during operation of said moving means, means for mounting said die member to permit it to rotate under control of the intermeshing teeth of the die member and the spaced members.

7. Apparatus for making a torque-transmitting element of compressed powdered material and having external teeth each disposed at an angle to the axis of rotation of the element comprising spaced annular members and a die member having a circular opening therethrough receiving said spaced members and defining therewith a cavity for the reception of powdered material, said die member having internal teeth defining the circular opening therein and meshing with external teeth on said spaced members and also extending into said cavity, the teeth of said members being disposed at angles to the axis of the opening of said die member; an elongate element disposed within the openings in said spaced annular members and extending through the powdered material in said cavity; means for moving said spaced members toward each other to compress the powdered material in said cavity to form the torque-transmitting element; a set of thrust elements disposed between and engaged by said moving means and one of said spaced members and having engaged bearing surfaces; a set of thrust elements disposed between and engaging said moving means and the other of said spaced members and having engaged bearing surfaces, said sets of thrust elements allowing rotation of said members relative to said moving means during operation of said moving means; and bearing means rotatably supporting said die member, said bearing means including a resilient supporting member adapted to be compressed during operation of said moving means.

8. Apparatus for making a torque-transmitting element of compressed powdered material and having external teeth each disposed at an angle to the axis of rotation of the element comprising spaced annular members and a die member having a circular opening therethrough receiving said spaced members and defining therewith a cavity for the reception of powered material, said die member having internal teeth defining the circular opening therein and meshing with external teeth on said spaced members and also extending into said cavity, the teeth of said members being disposed at angles to the axis of the opening of said die member; an elongate element disposed within the openings in said spaced annular members and extending through the powdered material in said cavity; means for moving said spaced members toward each other to compress the powdered material in said cavity to form the torque-transmitting element; a set of thrust elements disposed between and engaged by said moving means and one of said spaced members and having engaged bearing surfaces; a set of thrust elements disposed between and engaging said moving means and the other of said spaced members and having engaged bearing surfaces, said sets of thrust elements allowing rotation of said members relative to said moving means during operation of said moving means; bearing means rotatably supporting said die member on said moving means, said bearing means including a resilient supporting member adapted to be compressed during operation of said moving means and resilient means supporting said elongate element so that it may move relative to said cavity as the spaced members move toward each other.

9. Apparatus for making a gear of compressed powdered material and having external helical teeth comprising spaced annular members and a die member having a circular opening therethrough receiving said spaced members and defining therewith a cavity for the reception of powdered material, said die member having internal helical teeth defining the circular opening therein and meshing with external helical teeth on said spaced members and also extending into said cavity, an elongate element disposed within the openings in said spaced annular members and extending through the powdered material in said cavity; means for moving said spaced members toward each other to compress the powdered material in said cavity to form the gear; a set of thrust elements disposed between and engaged by said moving means and one of said spaced members and having engaged bearing surfaces; a set of thrust elements disposed between and engaged by said moving means and the other of said spaced members and having engaged bearing surfaces, said sets of thrust elements allowing rotation of said members relative to said moving means during operation of said moving means; means rotatably supporting said die member on said moving means including a resilient supporting member adapted to be compressed during operation of said moving means.

10. Apparatus for making a gear of compressed powdered material and having external helical teeth comprising spaced annular members and a die member having a circular opening therethrough receiving said spaced members and defining therewith a cavity for the reception of powdered material, said die member having internal helical teeth defining the circular opening therein and meshing with external helical teeth on said spaced members and also extending into said cavity, an elongate element disposed within the openings in said spaced annular members and extending through the powdered material in said cavity; means for moving said spaced members toward each other to compress the powdered material in said cavity to form the gear; a set of thrust elements disposed between and engaged by said moving means and one of said spaced members and having engaged bearing surfaces; a set of thrust elements disposed between and engaged by said moving means and the other of said spaced members, said sets of thrust elements allowing rotation of said members relative to said moving means during operation of said moving means; anti-friction means engaging said moving means and spaced from said die member; and resilient means extending between said anti-friction means and said die member and adapted to be compressed and rotated thereby during operation of said moving means, and resilient means in the opening in one of said spaced annular elements and engaging said guide element at one end thereof and one of said sets of thrust elements.

11. Apparatus for making a torque-transmitting element of compressed powdered material and having external teeth each disposed at an angle to the axis of rotation of the element comprising an assembly of spaced annular punch members and a die member having a circular opening therethrough receiving said spaced members and defining therewith a cavity for the reception of powdered material, said die member having internal teeth defining the circular opening therein and meshing with external teeth on said spaced punch members and also extending into said cavity, the teeth of said members being disposed at angles to the axis of the opening of said die member; a press having elements movable relative to each other along the axis of said die member for moving said spaced punch members toward each other to compress the powdered material in said cavity to form the torque-transmitting element; means for mounting said assembly between said press elements for relative rotation of said members of the assembly during operation of said press, the relative rotation between the punch members and the die members being controlled solely by the meshing teeth of said members.

12. Apparatus for making a torque-transmitting element of compressed powdered material and having external teeth each disposed at an angle to the axis of rotation of the element comprising an assembly of spaced annular members and a die member having a circular opening therethrough receiving said spaced members and defining therewith a cavity for the reception of powdered material, said die member having internal teeth defining the circular opening therein and meshing with external teeth on said spaced members and also extending into said cavity, the teeth of said members being disposed at angles to the axis of the opening of said die member; a core rod disposed within the openings in said spaced annular members and extending through the powdered material in said cavity; a press having a stationary base plate and a movable platen for moving said spaced members toward each other to compress the powdered material in said cavity to form the torque-transmitting element; a set of thrust elements disposed between and engaged by said base plate and one of said spaced members and having engaged bearing surfaces; a set of thrust elements disposed between and engaged by said platen and the other of said spaced members, the spaced members being freely rotatable on said thrust elements and bearing means supporting said die member for relative rotation to said spaced members caused by the meshing teeth of the spaced members and the die member.

13. Apparatus for making a torque-transmitting element of compressed powdered material and having external teeth each disposed at an angle to the axis of rotation of the element comprising an assembly of spaced annular members and a die member having a circular opening therethrough receiving said spaced members and defining therewith a cavity for the reception of powdered material, said die member having internal teeth defining the circular opening therein and meshing with external teeth on said spaced members and also extending into said cavity, the teeth of said members being disposed at angles to the axis of the opening of said die member; a core rod disposed within the openings in said spaced annular members and extending through the powdered material in said cavity; a press having a stationary base plate and a movable platen for moving said spaced members toward each other to compress the powdered material in said cavity to form the torque-transmitting element; a set of thrust elements disposed between and engaged by said base plate and one of said spaced members and having bearing engaged surfaces; a set of thrust elements disposed between and engaged by said platen and the other of said spaced members, the thrust elements of each set being rotatable relative to each other during rotation of said members relative to each other by the teeth thereof during operation of said press; a thrust bearing engaging said base plate and spaced from said die member; and resilient means extending between said thrust bearing and said die member and adapted to be compressed and rotated thereby during rotation of said die member by the operation of said press, and resilient means disposed in the opening in said one spaced member and supporting said core rod on said first set of thrust elements.

14. Apparatus for making a torque-transmitting element of compressed powdered material and having external teeth each disposed at an angle to the axis of rotation of the element comprising spaced freely rotatable annular members and a freely rotatable die member in telescoping relation with said spaced members and defining therewith a cavity for the reception of powdered material, said die member having internal teeth meshing with external teeth on said spaced members and also extending into said cavity, the teeth of said members being disposed at angles to the axis of the opening of said die member; and means for moving said spaced members toward each other and thereby causing said meshing teeth of said spaced members and said die holder to rotate said members relative to each other to compress the powdered material in said cavity to form the torque-transmitting element.

15. Apparatus for making a torque-transmitting element of compressed powdered material and having external teeth each disposed at an angle to the axis of rotation of the element comprising spaced punch members, a die member having a circular opening therethrough receiving said spaced members and defining therewith a cavity for the reception of powdered material, said die member having internal helical teeth meshing with external helical teeth on said spaced members and also extending into said cavity; a press having relatively movable spaced parts for moving said spaced members toward each other and thereby to cause rotation of the spaced members in a helical direction by the helical teeth of the members to compress the powdered material between said spaced members and the teeth of said die member to form the torque-transmitting element; means disposed between and engaged by said parts of said press and said spaced members to allow relative rotation of said members and means for supporting said die member on one of said pressed parts to allow said die member to rotate relative to said spaced members during operation of said press.

16. Apparatus for making a gear of compressed powdered material and having external teeth each disposed at an angle to the axis of rotation of the gear comprising spaced members mounted for free rotation and movable toward each other; a die member having an opening therethrough also mounted for free rotation and cooperating with said spaced members to define a cavity for the reception of the powdered material, said spaced members having external teeth extending into said cavity and meshing with internal teeth on said die member with said internal teeth defining the sides of said cavity, both sets of teeth being disposed at the angles to the axis to said die opening and means to move the spaced members toward each other whereby the meshing teeth of the spaced members and the die member cause relative rotation of said members and compress the material in the cavity to form a gear.

References Cited in the file of this patent

UNITED STATES PATENTS

| | | |
|---|---|---|
| 2,209,404 | Lassman | July 30, 1940 |
| 2,300,302 | Morin | Oct. 27, 1942 |
| 2,311,940 | Grob | Feb. 23, 1943 |
| 2,385,617 | Eiseman | Sept. 25, 1945 |
| 2,483,267 | Fawick | Sept. 27, 1949 |
| 2,522,712 | Gotberg | Sept. 19, 1950 |
| 2,561,735 | Haller | July 24, 1951 |